(12) United States Patent
Shafer et al.

(10) Patent No.: US 7,950,738 B2
(45) Date of Patent: May 31, 2011

(54) LATCH BELT STORAGE SYSTEM FOR JUVENILE VEHICLE SEAT

(75) Inventors: Ryan Shafer, Uxbridge, MA (US); David Amirault, Easton, MA (US)

(73) Assignee: Cosco Management, Inc., Wilmington, DE (US)

( * ) Notice: Subject to any disclaimer, the term of this patent is extended or adjusted under 35 U.S.C. 154(b) by 241 days.

(21) Appl. No.: 12/205,245

(22) Filed: Sep. 5, 2008

(65) Prior Publication Data

US 2009/0066130 A1 Mar. 12, 2009

Related U.S. Application Data

(60) Provisional application No. 60/970,177, filed on Sep. 5, 2007.

(51) Int. Cl.
*A47C 1/08* (2006.01)
(52) U.S. Cl. .................. 297/256.16; 297/481
(58) Field of Classification Search ............ 297/250.1, 297/256.16, 468, 481, 188.1
See application file for complete search history.

(56) References Cited

U.S. PATENT DOCUMENTS

| 4,291,915 | A | * | 9/1981 | Cox .................... 190/8 |
| 5,286,086 | A | * | 2/1994 | Gunji ............... 297/250.1 |
| 6,705,676 | B1 | | 3/2004 | Berringer et al. |
| 6,863,345 | B2 | | 3/2005 | Kain |
| 7,246,854 | B2 | * | 7/2007 | Dingman et al. ..... 297/250.1 |
| 7,464,989 | B2 | * | 12/2008 | Merrill ............... 297/250.1 |
| 2005/0110318 | A1 | | 5/2005 | Meeker et al. |
| 2005/0264062 | A1 | | 12/2005 | Longenecker et al. |
| 2006/0261650 | A1 | | 11/2006 | Billman et al. |

* cited by examiner

*Primary Examiner* — David Dunn
*Assistant Examiner* — Tania Abraham
(74) *Attorney, Agent, or Firm* — Barnes & Thornburg LLP (57) ABSTRACT

A child restraint including a juvenile seat configured to be mounted on a seat base. The seat base includes a seat support and a LATCH system including first and second anchor belts for anchoring the seat support to the seat of a vehicle. The seat base includes a storage compartment for storing free ends of the anchor belts when the anchor belts are detached from the vehicle.

20 Claims, 5 Drawing Sheets

LATCH BELT STORAGE SYSTEM FOR JUVENILE VEHICLE SEAT

This application claims priority under 35 U.S.C. §119(e) to U.S. Provisional Application Ser. No. 60/970,177, filed Sep. 5, 2007, which is expressly incorporated herein by reference.

BACKGROUND

The present disclosure relates to juvenile vehicle seats, and particularly to lower anchors and tethers for coupling juvenile vehicle seats to seats in vehicles. More particularly, the present disclosure relates to a system for storing lower anchors and tethers onboard a seat base for a juvenile vehicle seat.

SUMMARY

According to the present disclosure, a child restraint includes a seat base and juvenile seat configured to be mounted on the seat base. The seat base includes a seat support configured to mate with the juvenile seat and anchor means for anchoring the seat support to fixtures included in a seat in a vehicle to tether the seat support to the vehicle seat.

In the illustrative embodiments, the anchor means includes first and second belts and provides a lower-anchors-and-tethers-for-children (LATCH) system configured to mate with fixtures included in the vehicle seat. Each belt includes a strap and an anchor hook coupled to a free end of the strap. The seat base is formed to include a storage compartment having an interior region sized to receive and store the anchor hooks included in the first and second belts of the LATCH system when not in use. The storage compartment includes a pivotable closure door and is located in a lower end portion of the seat base and is covered by the juvenile seat when the juvenile seat is mounted on the seat base.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 5 is an enlarged perspective view of the lower end portion of the seat base after the storage compartment has been fully opened to receive the two anchor hooks included in the LATCH system and showing that the storage compartment includes a U-shaped side wall formed to define an interior region containing three spaced-apart rod mounts, a first hook-receiver rod located in a space provided between the first and second rod mounts, and a second hook-receiver rod located in a space provided between the second and third rod mounts and that the storage compartment also includes a closure door mounted for pivotable movement to a middle section of the U-shaped side wall and moved to an opened position exposing the interior region of the storage compartment and suggesting movement of the two anchor hooks into the interior region of the opened storage compartment;

DETAILED DESCRIPTION

A child restraint 10 includes a juvenile seat 12 and a seat base 14 configured to removably receive juvenile seat 12. Seat base 14 includes a seat support 20 adapted to sit upon an underlying vehicle seat 200. Seat base 14 includes first and second anchor belts 40 and 42. First anchor belt 40 includes a first free end 44 having a first anchor hook 50 that is adapted to be coupled to a first stationary fixture 202 of the vehicle, and second anchor belt 42 includes a second free end 46 having a second anchor hook 56 adapted to be coupled to a second stationary fixture 204 of the vehicle, to anchor seat support 20 to the vehicle seat 200. Seat base 14 includes a storage compartment 24 having first and second hook-receiver rods 176 and 178 adapted to receive first and second anchor hooks 50 and 56 of first and second anchor belts 40 and 42 when first and second anchor hooks 50 and 56 are stored in storage compartment 24. Storage compartment 24 includes a closure door 128 that is pivotable between open and closed positions to provide selective access to an interior region 25 of storage compartment 24.

Figure 1:
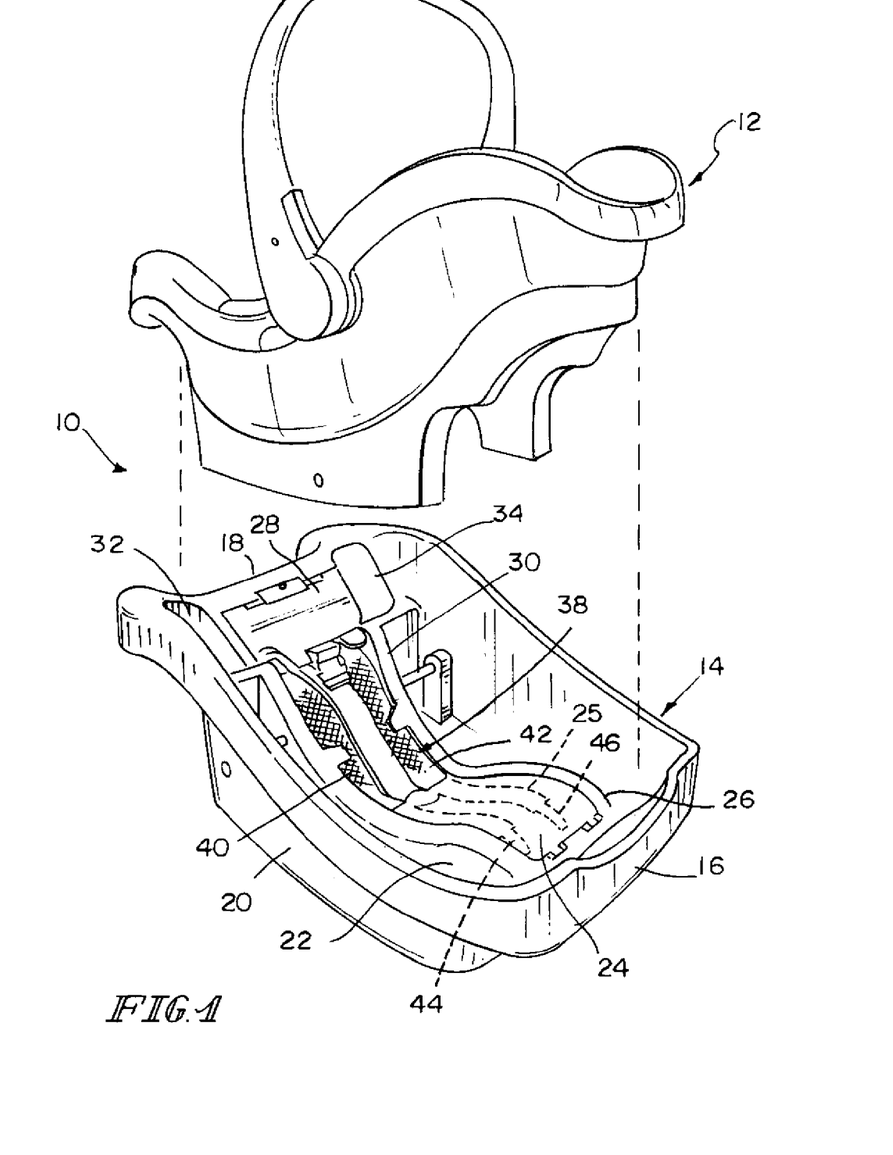
FIG. 1 is a perspective view of a child restraint including a juvenile seat configured to be mounted on a seat base that is adapted to set on an underlying seat in a vehicle and showing that the seat base includes a seat support resting on the underlying vehicle seat, a pair of straps coupled to the seat base and included in a LATCH system for anchoring the seat base to the vehicle seat, and a storage compartment provided in a lower end portion of the seat base and configured to receive and store an anchor hook coupled to a free end of each of the straps in the LATCH system.

A child restraint 10 as shown in FIG. 1, includes a juvenile seat 12 configured to be removably mounted to a seat base 14. Seat base 14 extends between a lower end 16 and an upper end 18. Seat base 14 includes a seat support 20 generally in the form of an open-top shell that is configured to receive juvenile seat 12. Seat base 14 includes a housing 22 located within seat support 20 that extends from lower end 16 to a position adjacent upper end 18 of seat base 14. A storage compartment 24 is located in a lower end 26 of housing 22. Seat base 14 includes a multi-part belt holder 28 at upper end 18 of seat base 14 adjacent an upper end 30 of housing 22. Seat support 20 includes a first belt port 32 located on a first transverse side of multi-part belt holder 28 and a second belt port 34 located on an opposite transverse side of multi-part belt holder 28.

Seat base 14 includes a lower-anchors-and-tethers-for-children (LATCH) system comprising a seat-base belt 38 including a first anchor belt 40 and a second anchor belt 42. First anchor belt 40 extends outwardly from upper end 18 of seat base 14 to a distal first free end 44. Second anchor belt 42 also extends outwardly from upper end 18 of seat base 14 to a distal second free end 46. First anchor belt 40 includes a flexible first strap 48 and an anchor member such as a first anchor hook 50 attached to the distal end of first strap 48 at first free end 44. First anchor belt 40 may also include an adjustment mechanism 49 configured to selectively adjust the length of first strap 48. First anchor hook 50 includes a first shank 51 extending along a first side of first anchor hook 50 having a first bite 52 at one end, and a resiliently flexible first safety latch 53 extending along a second side of the first anchor hook 50 opposite the first shank 51. Second anchor belt 42 includes a flexible second strap 54 and an anchor member such as a second anchor hook 56 attached to a distal end of second strap 54 at second free end 46. Second anchor hook 56 includes a second shank 55 extending along a first side of second anchor hook 56 having a second bite 58 at one end, and a resiliently flexible second safety latch 59 extending along a second side of the second anchor hook 56 opposite the second shank 55. The proximal ends of first strap 48 and second strap 54 may be attached to one another such that first and second straps 48 and 54 are formed as one continuous and integral strap member.

Figure 7:
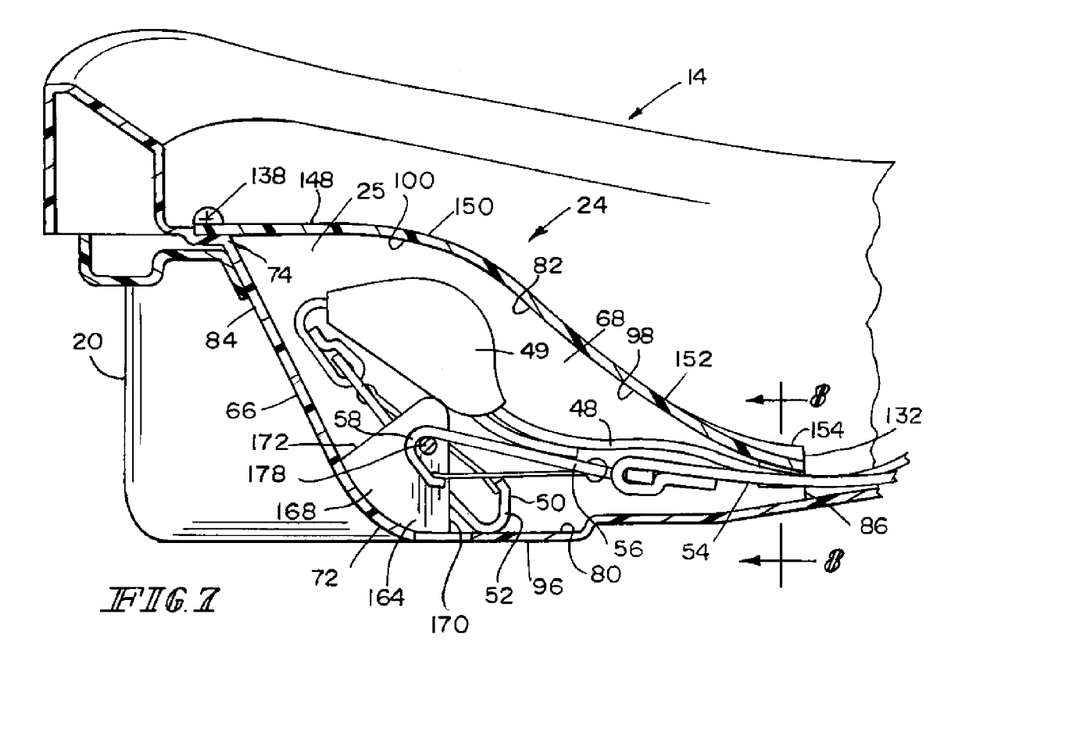
FIG. 7 is an enlarged sectional view taken along line 7-7 of FIG. 2 showing an illustrative orientation of the first and second anchor hooks of the LATCH system in the interior region of the storage compartment while the closure door is closed.
Figure 8:
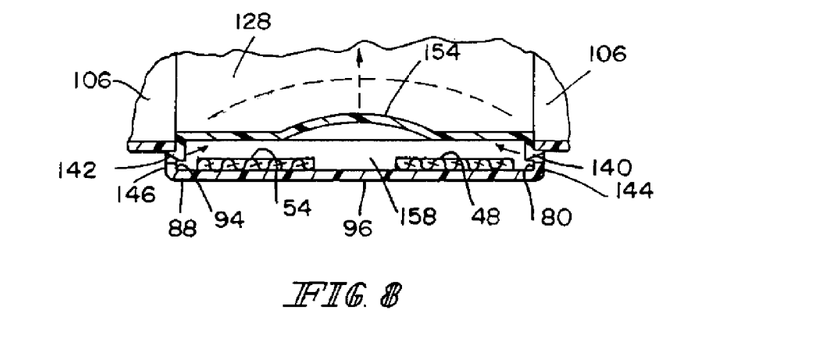
FIG. 8 is a sectional view taken along line 8-8 of FIG. 7.

Storage compartment 24 of housing 22 includes a generally U-shaped wall 64 which forms interior region 25 of storage compartment 24. U-shaped wall 64 includes an end wall 66, a first side wall 68 and a second side wall 70. End wall 66 extends upwardly between a bottom end 72 and a top end 74 and transversely between a first end 76 and a second end 78. First side wall 68 extends vertically upwardly from a bottom end 80 to a top end 82 and longitudinally from a first end 84 to a second end 86. Second side wall 70 extends vertically upwardly from a bottom end 88 to a top end 90 and longitudinally between a first end 92 and a second end 94. Second side wall 70 is formed in substantially the same manner, although in opposite hand, as first side wall 68. Bottom ends 72, 80 and 88 are located adjacent a bottom wall 96 of housing 22. As shown in FIG. 7, end wall 66 is inclined such that it extends upwardly and outwardly as end wall 66 extends from bottom end 72 toward top end 74.

Top end 82 of first side wall 68 includes a generally convexly curved portion 98 and a generally concavely curved portion 100. Concavely curved portion 100 is located between convexly curved portion 98 and first end 84 of first side wall 68. Second side wall 70 similarly includes a convexly curved portion and a concavely curved portion. As shown in FIG. 7, the height of first side wall 68 between bottom end 80 and top end 82 varies as first side wall 68 extends between first end 84 and second end 86 of first side wall 68. Top end 82 of first side wall 68 is inclined such that top end 82 slopes downwardly toward bottom wall 96. Similarly, the height of second side wall 70 between bottom end 88 and top end 90 varies as second side wall 70 extends between first end 92 and second end 94 of second side wall 70. Top end 90 of second side wall 70 is inclined such that top end 90 slopes downwardly toward bottom wall 96.

Housing 22 includes a generally U-shaped top wall 106 having a top surface 108. Top wall 106 extends generally around U-shaped wall 64. A generally U-shaped recessed ledge 110 extends around U-shaped wall 64 and along and outwardly from top end 74 of end wall 66, top end 82 of first side wall 68 and top end 90 of second side wall 70, to U-shaped top wall 106. Recessed ledge 110 includes a top surface 112 that is spaced below top surface 108 such that a generally U-shaped recess 114 is formed above recessed ledge 110 in association with U-shaped top wall 106. Recessed ledge 110 includes a first ledge portion 116 that extends along and outwardly from top end 82 of first side wall 68, and a second ledge portion 118 that extends along and outwardly from top end 90 of second side wall 70. First and second ledge portions 116 and 118 are curved in the same manner as top ends 82 and 90 of first and second side walls 68 and 70. Recessed ledge 110 also includes a third ledge portion 120 that extends generally linearly along and outwardly from top end 74 of end wall 66. Top end 74 of end wall 66, top end 82 of first side wall 68 and top end 90 of second side wall 70 form a top opening 124 in housing 22 that is in communication with interior region 25.

Figure 2:
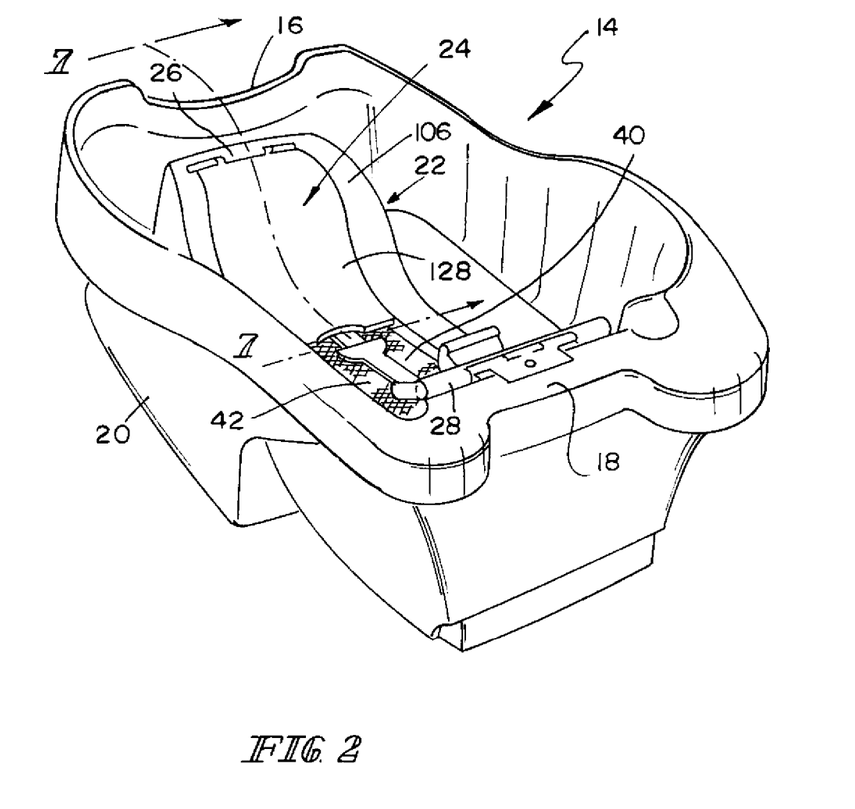
FIG. 2 is a view of the seat base of FIG. 1 from another point of view showing the closure door of the storage compartment in the closed position while the two anchor hooks of the LATCH system are retained in the interior region of the storage compartment as suggested in FIG. 7.

Storage compartment 24 of housing 22 includes a closure door 128. Closure door 128 extends between a first end 130 and a second end 132 and includes a first side edge 134 spaced apart from and generally parallel to a second side edge 136. First and second side edges 134 and 136 extend between first end 130 and second end 132 of closure door 128. First end 130 of closure door 128 is pivotably attached to U-shaped top wall 106 of housing 22 and is pivotable about a pivot axis 138 between open and closed positions. Closure door 128 include a first projection 140 at first side edge 134 adjacent second end 132, and a second projection 142 at second side edge 136 adjacent second end 132. First projection 140 is configured to be removably retained in a first detent 144 located in first side wall 68 at second end 86, and second projection 142 is configured to be removably retained within a second detent 146 located in second side wall 70 at second end 94, when closure door 128 is in the closed position as shown in FIGS. 1 and 2 to releasably retain closure door 128 in the closed position.

When closure door 128 is in the closed position, first side edge 134 is located adjacent first ledge portion 116 of recessed ledge 110, second side edge 136 of closure door 128 is located adjacent second ledge portion 118 of recessed ledge 110, and first end 130 of closure door 128 is located adjacent third ledge portion 120 of recessed ledge 110, such that first side edge 134, second side edge 136 and first end 130 of closure door 128 are located in U-shaped recess 114. A top surface 148 of closure door 128 is substantially flush with top surface 108 of adjacent U-shaped top wall 106 when closure door 128 is in the closed position. As shown in FIG. 7, closure door 128 includes a concavely curved portion 150 configured to mate with the convexly curved portion of top ends 82 and 90 of first and second side walls 68 and 70, and a convexly curved portion 152 adapted to mate with the convexly curved portion of the top ends 82 and 90 of first and second side walls 68 and 70. First end 130 of closure door 128 includes a raised finger grip 154 adapted to facilitate manual movement of closure door 128 from the closed position to the open position. Bottom wall 96 of housing 22 may include a depression 156 located below finger grip 154 to additionally facilitate manual movement of closure door 128 from the closed position to the open position. When closure door 128 is in the closed position, second end 132 of closure door 128 forms a belt passageway 158 with bottom wall 96 of housing 22 through which first and second straps 48 and 54 may pass when first and second free ends 44 and 46 of first and second anchor belts 42 are stored in interior region 25 of storage compartment 24.

Figure 5:
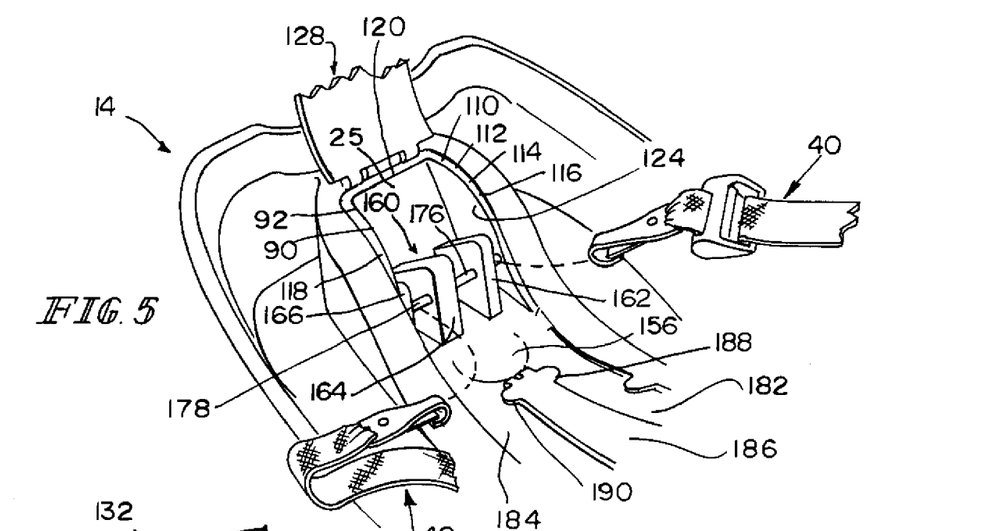

Storage compartment 24 includes a mounting member 160 located within interior region 25. Mounting member 160 is configured to removably retain first and second free ends 44 and 46 and first and second anchor hooks 50 and 56 of first and second anchor belts 40 and 42 within interior region 25 of storage compartment 24. As shown in FIG. 5, mounting member 160 includes a first rod mount 162, a second rod mount 164 and a third rod mount 166. First rod mount 162 is attached to and extends inwardly from first side wall 68, third rod mount 166 is attached to and extends inwardly from second side wall 70, and second rod mount 164 is located generally midway between first rod mount 162 and third rod mount 166 and spaced apart from first rod mount 162 and third rod mount 166. Each rod mount 162, 164 and 166 includes a base 168 attached to housing 22, a generally planar front wall 170 extending upwardly from the base 168, and a generally planar rear wall 172 extending outwardly from base 168 toward front wall 170, such that each rod mount is generally triangular-shaped. A first hook-receiver rod 176 extends between and is attached at opposite ends to first rod mount 162 and second rod mount 164. A second hook receiver rod 178 extends between and is attached at opposite ends to second rod mount 164 and third rod mount 166. First hook-receiver rod 162 and second hook-receiver rod 164 are generally coaxially aligned with one another and extend generally transversely with respect to first side wall 68 and second side wall 70 of storage compartment 24 and generally parallel to pivot axis 138 of closure door 128.

An elongate first channel 182 and an elongate second channel 184 are formed and recessed in top wall 106 of housing 22. First and second channels 182 and 184 are generally parallel to one another and extend from a proximal end in communication with interior region 25 of storage compartment 24 to a distal end in communication with multi-part belt holder 28. A divider member 186 is located between first channel 182 and second channel 184. First channel 182 is configured to removably receive first strap 48 of first anchor belt 40 and second channel 184 is configured to removably receive second strap 54 of second anchor belt 42. The proximal end of divider member 186 includes a first inner tab 188 overhanging an inner side of first channel 182 and a second inner tab 190 overhanging an inner side of second channel 184. A first outer tab 192 overhangs an outer side of first channel 182 from top wall 106. A second outer tab 194 overhangs an outer side of second channel 184 from top wall 106. A first distal inner tab and a second distal inner tab are located beneath the multi-part holder 28. The first distal inner tab overhangs the inner side of first channel 182 and the second distal inner tab overhangs an inner side of second channel 184. First inner tab 188, first outer tab 192 and the first distal inner tab releasably retain first strap 48 within first channel 182. Second inner tab 190, second outer tab 194 and the second distal inner tab releasably retain second strap 54 within second channel 184.

Figure 6:
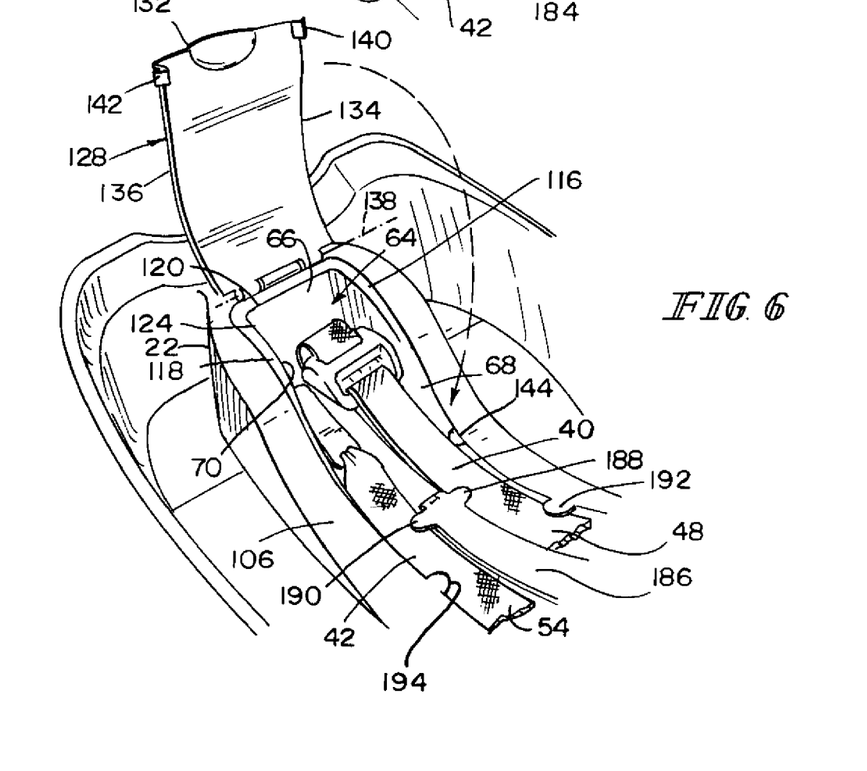
FIG. 6 is a view similar to FIG. 5 showing placement of the anchor hooks in the interior region of the storage compartment and showing the first anchor hook coupled to the first hook-receiver rod and the second anchor hook coupled to the second hook-receiver rod and suggesting pivoting movement of the closure door toward the closed position shown in FIGS. 1 and 7.

As shown in FIGS. 1 and 2, first and second anchor belts 40 and 42 may be located in a stored position wherein first and second free ends 44 and 46 of first and second anchor belts 40 and 42 are stored and located within interior region 25 of storage compartment 24, first strap 48 is located within first channel 182 and second strap 54 is located within second channel 184. As shown in FIGS. 6 and 7, when first and second anchor belts 40 and 42 are in the stored position, first anchor hook 50 of first anchor belt 40 is coupled to first hook-receiver rod 176. First bite 52 of first anchor hook 50 is spaced apart from first hook-receiver rod 176 and is located on an opposite side of first hook-receiver rod 176 with respect to pivot axis 138 of closure door 128. Adjustment mechanism 49 is located between first hook-receiver rod 176 and closure door 128. First strap 48 of first anchor belt 40 extends through belt passageway 158 from interior region 25 and is located within first channel 182. Second anchor hook 56 of second anchor belt 42 is coupled to second hook-receiver rod 178 with second bite 58 of second anchor hook 56 engaging second hook-receiver rod 178 and located between hook-receiver rod 178 and pivot axis 138 of closure door 128. Second strap 54 of second anchor belt 42 extends through belt passageway 158 from interior region 25 and is located within second channel 184. Closure door 128 is in the closed position to substantially close the top opening 124. Juvenile seat 12 overlies and encloses first and second anchor belts 40 and 42 and the storage compartment 24 when juvenile seat 12 is mounted to seat base 14.

Figure 3:
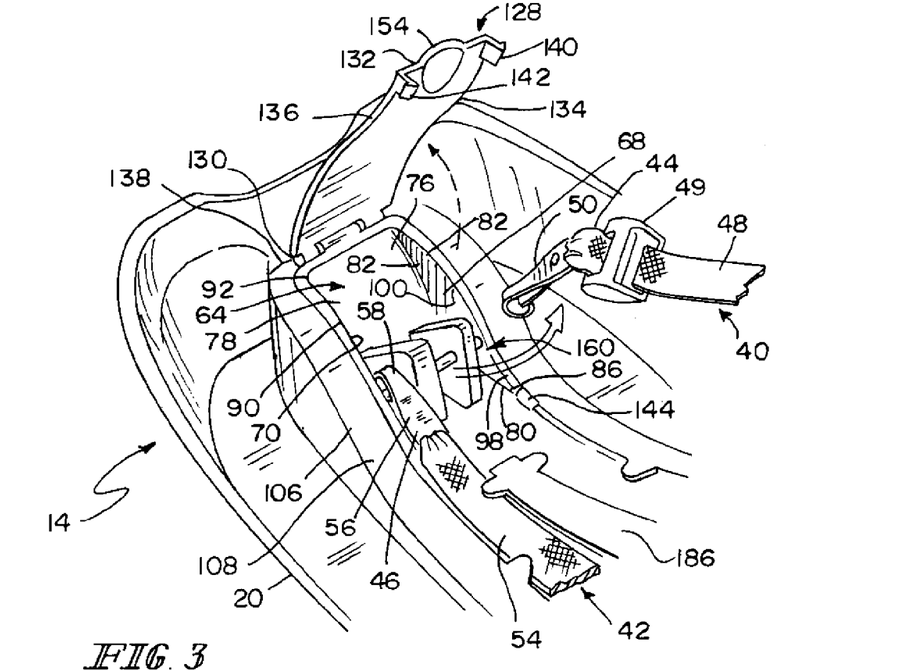
FIG. 3 is an enlarged perspective view of the seat base of FIG. 2 showing the closure door moving toward a fully open position and showing the first anchor hook of the first anchor belt has been detached from a first hook-receiver rod in the storage compartment while the second anchor hook of the second anchor belt remains coupled to a second hook-receiver rod in the storage compartment.

As suggested in FIG. 3, when it is desired to remove first and second anchor belts 40 and 42 from the stored position, finger grip 154 at second end 132 of closure door 128 is manually grasped and lifted upwardly to thereby release first and second projections 140 and 142 from first and second detents 144 and 146 of housing 22 and pivot the closure door 128 to the open position. First anchor hook 50 is shown as released from first hook-receiver rod 76. First free end 44 of first anchor belt 40 is shown as removed from interior region 25 of storage compartment 24 and first strap 48 is removed from first channel 182. Similarly, second anchor hook 56 is released from second hook-receiver rod 78 whereupon second free end 46 of second inner belt 42 is removed from interior region 25 of storage compartment 24 and second strap 54 is removed from second channel 184.

Figure 4:
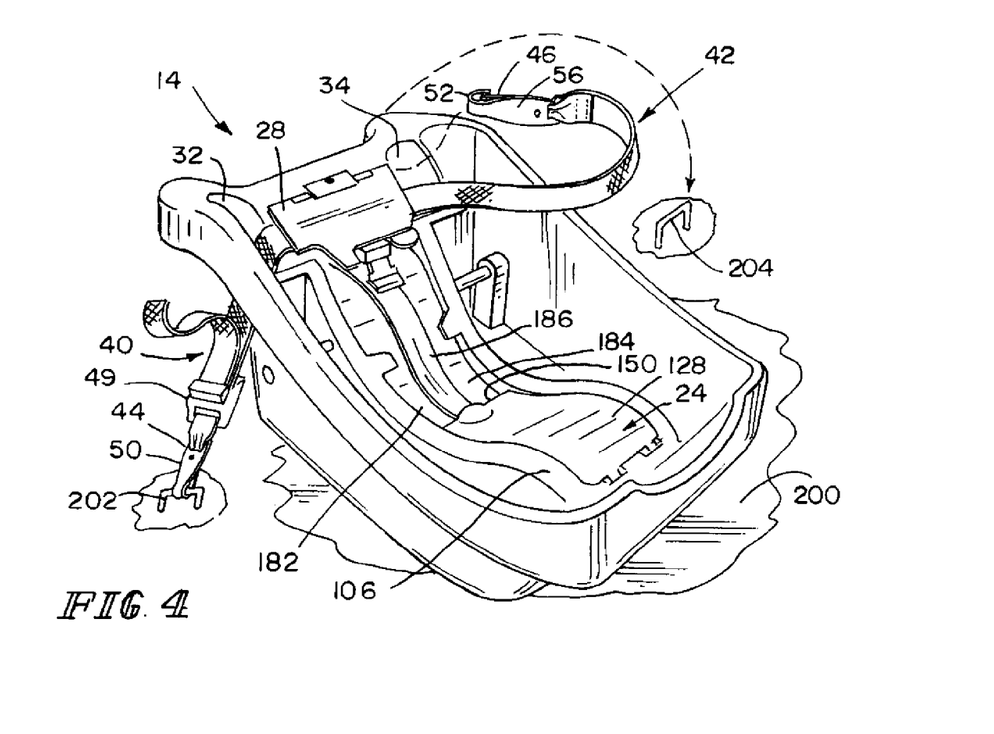
FIG. 4 is an enlarged perspective view of the seat base of FIG. 1 showing the straps and anchor hooks of the LATCH system after they have been removed from the storage compartment and showing that a first anchor belt including the first strap and anchor hook has been coupled to a first stationary fixture associated with the vehicle seat and movement of a second anchor belt including the second strap and anchor hook along a path to mate with a second stationary fixture associated with the vehicle seat.

As suggested in FIG. 4, when seat base 14 is located upon an underlying vehicle seat 200 of a vehicle, first and second anchor belts 40 and 42 may be rearranged to a splayed position. First free end 44 of first anchor belt 40 is threaded through first belt port 32 and first anchor hook 50 is coupled to a first stationary fixture 202 of the vehicle that is associated with vehicle seat 200. Second free end 46 of second anchor belt 42 is then threaded through second belt port 34 and second anchor hook 56 is coupled to a second stationary fixture 204 of the vehicle that is associated with vehicle seat 200. The length of the seat-base belt 38 and thereby of first and second anchor belts 40 and 42 may thereafter be adjusted by the adjustment mechanism 49 such that the seat support 20 is securely anchored to vehicle seat 200.

First and second anchor belts 40 and 42 may be moved to the stored position when the child restraint 10 is removed from the vehicle or when a vehicle does not include first and second stationary fixtures 18 and 20 whereupon seat base 14 may be anchored to vehicle seat 200 by a passenger restraint system of the vehicle including a vehicle lap belt and vehicle shoulder belt. When first and second anchor belts 40 and 42 are rearranged from the splayed position to the stored position, first anchor hook 50 is released from first stationary fixture 202 and is threaded through first belt port 42. First anchor hook 50 is then coupled to first hook-receiver rod 176 in an orientation as shown in FIG. 7 such that first anchor hook 50 and adjustment mechanism 49 are located within interior region 25 of storage compartment 24. First strap 48 of first anchor belt 40 is then positioned within first channel 182 and underneath first inner tab 188 and first outer tab 192 as shown in FIG. 6. Similarly, second anchor hook 56 is released from second stationary fixture 204 and is threaded through second belt port 34. Second anchor hook 56 is then coupled to second hook-receiver rod 178 in an orientation as shown in FIG. 7 such that second anchor hook 56 of second anchor belt 42 is located within an interior region 25 of storage compartment 24. Second strap 54 is positioned within second channel 184 beneath second inner tab 190 and second outer tab 194 as shown in FIG. 6. Closure door 128 may then be pivoted to the closed position as shown in FIGS. 2 and 7 whereupon first strap 48 and second strap 54 extend through passageway 158 at second end 132 of closure door 128.

The invention claimed is:

1. A seat base for a child restraint adapted to receive a juvenile seat, the seat base comprising
   a seat-base belt including a first anchor belt having a first free end adapted to mate with a first stationary fixture associated with a vehicle seat of a vehicle, and a second anchor belt having a second free end adapted to mate with a second stationary fixture associated with the vehicle seat, such that the seat-base belt anchors the seat base to the vehicle seat,
   storage means for storing the first and second free ends of the first and second anchor belts when the first and second free ends of the first and second anchor belts are detached from the first and second stationary fixtures,
   wherein the storage means comprises a housing including a generally U-shaped wall having an end wall, a first side wall having a first end and a second end, the first side wall extending outwardly from the end wall, a second side wall having a first end and a second end, the second side wall extending outwardly from the end wall, and an interior region formed between the end wall and the first and second side walls wherein the first free end of the first anchor belt and the second free end of the second anchor belt may be stored when the first and second free ends are detached from the first and second stationary fixtures,
   wherein the end wall includes a bottom end and top end, the first side wall includes a bottom end and top end, and the second side wall includes a bottom end and a top end, the height of the first side wall between the bottom end and top end of the first side wall varying between the first end and second end of the first side wall, and the height of the second side wall between the bottom end and top end of the second side wall varying between the first end and second end of the second side wall, and
   wherein the end wall is inclined outwardly with respect to the interior region as the end wall extends from the bottom end of the end wall toward the top end of the end wall.

2. The seat base of claim 1, wherein the top end of the first side wall includes a first concavely curved portion and a first convexly curved portion, the first concavely curved portion being located more closely to the first end of the first side wall than the first convexly curved portion of the top end of the first side wall, and the top end of the second side wall includes a second concavely curved portion and a second convexly curved portion, the second concavely curved portion being located more closely to the first end of the second side wall than the second convexly curved portion of the top end of the second side wall.

3. The seat base of claim 1, wherein the height of the first side wall at the first end of the first side wall is greater than the height of the first side wall at the second end of the first side wall, and the height of the second side wall at the first end of the second side wall is greater than the height of the second side wall at the second end of the second side wall.

4. A seat base for a child restraint adapted to receive a juvenile seat, the seat base comprising
   a seat-base belt including a first anchor belt having a first free end adapted to mate with a first stationary fixture associated with a vehicle seat of a vehicle, and a second anchor belt having a second free end adapted to mate with a second stationary fixture associated with the vehicle seat, such that the seat-base belt anchors the seat base to the vehicle seat,
   storage means for storing the first and second free ends of the first and second anchor belts when the first and second free ends of the first and second anchor belts are detached from the first and second stationary fixtures,
   wherein the storage means comprises a housing including a generally U-shaped wall having an end wall, a first side wall having a first end and a second end, the first side wall extending outwardly from the end wall, a second side wall having a first end and a second end, the second side wall extending outwardly from the end wall, and an interior region formed between the end wall and the first and second side walls wherein the first free end of the first anchor belt and the second free end of the second anchor belt may be stored when the first and second free ends are detached from the first and second stationary fixtures, and
   further comprising a door having a first end, a second end, a first side edge and a second side edge, the first end of the door pivotally attached to the housing adjacent the top end of the end wall, the door being selectively pivotable between an open position and a closed position, the door enclosing a top opening to the interior region formed between the top ends of the first and second side walls when the door is in the closed position, the second end of the door forming a belt passageway through which at least the first anchor belt extends when the door is in the closed position and when the first free end of the first anchor belt is stored in the interior region, the door providing access to the interior region through the top opening when the door is in the open position.

5. The seat base of claim 4, further comprising a generally U-shaped top wall having a top surface extending around the top ends of the end wall and first and second side walls, and a generally U-shaped recessed ledge extending around the top ends of the end wall and the first and second side walls, the recessed ledge extending outwardly from the top edges of the end wall and first and second side walls toward the U-shaped top wall, the recessed ledge having a top surface located below the top surface of the U-shaped top wall forming a generally U-shaped recess, the U-shaped recess configured to receive the first end and the first and second side edges of the door when the door is in the closed position such that a top surface of the door is substantially flush with the top surface of the U-shaped top wall.

6. A seat base for a child restraint adapted to receive a juvenile seat, the seat base comprising
   a seat-base belt including a first anchor belt having a first free end adapted to mate with a first stationary fixture associated with a vehicle seat of a vehicle, and a second anchor belt having a second free end adapted to mate with a second stationary fixture associated with the vehicle seat, such that the seat-base belt anchors the seat base to the vehicle seat,
   storage means for storing the first and second free ends of the first and second anchor belts when the first and second free ends of the first and second anchor belts are detached from the first and second stationary fixtures,
   wherein the storage means comprises a housing having an interior region, and a mounting member located within the interior region, the mounting member configured to receive the first free end of the first anchor belt and the second free end of the second anchor belt when the first and second anchor belts are detached from the first and second stationary fixtures, and wherein the mounting member comprises a first hook-receiver rod extending generally transversely between a first side wall and a second side wall of the housing.

7. The seat base of claim 6, wherein the mounting member further comprises a first rod mount located adjacent the first side wall, a second rod mount, and a third rod mount located adjacent the second side wall, the second rod mount being located generally midway between and spaced apart from the first and second rod mounts, the first hook-receiver rod extending between the first rod mount and the second rod mount, and a second hook-receiver rod extending between the second rod mount and the third rod mount generally coaxially with the first hook-receiver rod.

8. The seat base of claim 7, wherein each of the first, second and third rod mounts includes a base attached to the housing, a front wall extending upwardly from the base and a rear wall extending outwardly from the base toward the front wall.

9. A seat base for a child restraint adapted to receive a juvenile seat, the seat base comprising a seat-base belt including a first anchor belt having a first free end adapted to mate with a first stationary fixture associated with a vehicle seat of a vehicle, and a second anchor belt having a second free end adapted to mate with a second stationary fixture associated with the vehicle seat, such that the seat-base belt anchors the seat base to the vehicle seat, storage means for storing the first and second free ends of the first and second anchor belts when the first and second free ends of the first and second anchor belts are detached from the first and second stationary fixtures, wherein the storage means comprises a housing having an interior region, and a mounting member located within the interior region, the mounting member configured to receive the first free end of the first anchor belt and the second free end of the second anchor belt when the first and second anchor belts are detached from the first and second stationary fixtures, and wherein the mounting member comprises a first hook-receiver rod and a second hook-receiver rod coaxially aligned with the first hook receiver rod, the first and second hook receiver rods extending generally transversely between a first side wall and a second side wall of the housing, the seat base further comprising a door having a first end and a second end, the first end of the door pivotably attached to the housing such that the door is pivotable about a pivot axis between an open position and a closed position, the pivot axis is substantially parallel to the first and second hook-receiver rods, the door including a first side edge configured to extend along a top edge of the first side wall and a second side edge configured to extend along a top edge of the second side wall when the door is in the closed position, the first end of the door forming a belt passageway with a bottom wall of the housing when the door is in the closed position.

10. The seat base of claim 9, wherein the first anchor belt includes a first anchor hook at the first free end having a bite and an adjustment mechanism, and the second anchor belt includes a second anchor hook at the second free end having a bite, the second anchor hook configured to be coupled to the second hook-receiver rod such that the bite of the second anchor hook is located adjacent the second hook-receiver rod and between the second hook-receiver rod and the pivot axis of the door, the first anchor hook configured to be coupled to the first hook-receiver rod such that the bite of the first anchor hook is spaced apart from the first hook-receiver rod and is located on an opposite side of the first hook-receiver rod with respect to the pivot axis of the door and the adjustment mechanism of the first anchor belt is located between the first hook-receiver rod and the door when the door is in the closed position.

11. A seat base for a child restraint adapted to receive a juvenile seat, the seat base comprising a seat-base belt including a first anchor belt having a first free end adapted to mate with a first stationary fixture associated with a vehicle seat of a vehicle, and a second anchor belt having a second free end adapted to mate with a second stationary fixture associated with the vehicle seat, such that the seat-base belt anchors the seat base to the vehicle seat, storage means for storing the first and second free ends of the first and second anchor belts when the first and second free ends of the first and second anchor belts are detached from the first and second stationary fixtures, and wherein the storage means comprises a housing having an interior region configured to receive the first and second free ends of the first and second anchor belts when the first and second free ends are detached from the first and second stationary fixtures, a first channel in the housing extending outwardly from the interior region, and a second channel in the housing extending outwardly from the interior region, the first channel configured to receive a first strap of the first anchor belt and the second channel configured to receive a second strap of the second anchor belt when the first and second free ends of the first and second anchor belts are located in the interior region.

12. The seat base of claim 11, further comprising a plurality of tabs overhanging the first channel to retain the first strap within the first channel, and a plurality of tabs overhanging the second channel to retain the second strap within the second channel.

13. The seat base of claim 12, further comprising a divider member separating the first channel from the second channel, the divider member including a proximal end and a distal end, the proximal end of the divider member including a first inner tab overhanging an inner side of the first channel and a second inner tab overhanging an inner side of the second channel, a first outer tab overhanging an outer side of the first channel and a second outer tab overhanging an outer side of the second channel.

14. A seat base for a child restraint adapted to receive a juvenile seat, the seat base comprising a seat-base belt including a first anchor belt having a first free end adapted to mate with a first stationary fixture associated with a vehicle seat of a vehicle, and a second anchor belt having a second free end adapted to mate with a second stationary fixture associated with the vehicle seat, such that the seat-base belt anchors the seat base to the vehicle seat, storage means for storing the first and second free ends of the first and second anchor belts when the first and second free ends of the first and second anchor belts are detached from the first and second stationary fixtures, wherein the storage means comprises a housing having an interior region configured to receive the first and second ends of the first and second anchor belts when the first and second ends are detached from the first and second stationary fixtures, the housing having a top opening in communication with the interior region, and a door having a first end and a second end, the first end of the door pivotally attached to the housing such that the door is selectively pivotable between an open position and a closed position, the door allowing access to the interior region through the top opening when the door is in the open position, the door substantially enclosing the top opening when the door is in the closed position, and wherein the second end of the door forms a belt passageway in communication with the interior region when the door is in the closed position.

15. The seat base of claim 14, wherein the door includes a concavely curved portion and a convexly curved portion, the concavely curved portion located between the first end of the door and the convexly curved portion.

16. The seat base of claim 14, wherein the second end of the door includes a first projection and a second projection, and the housing includes a first detent adapted to receive the first projection and a second detent adapted to receive the second projection when the door is in the closed position.

17. A seat base for a child restraint adapted to receive a juvenile seat, the seat base comprising a seat-base belt including a first anchor belt having a first free end with a first anchor hook adapted to mate with a first stationary fixture associated with a vehicle seat of a vehicle, and a second anchor belt having a second free end with a second anchor hook adapted to mate with a second stationary fixture associated with the vehicle seat, such that the seat-base belt anchors the seat base to the vehicle seat, a housing having an interior region, a first hook-receiver rod, a second hook-receiver rod, and a rod mount located in the interior region, the second hook-receiver rod substantially coaxially aligned with the first hook-receiver rod, the rod mount located between the first hook-receiver rod and the second hook-receiver rod, the first hook-receiver rod and the second hook-receiver rod extending outwardly from the rod mount, whereby the first anchor hook is configured to be coupled to the first hook-receiver rod in a stored position when the first anchor hook is detached from the first stationary fixture, and the second anchor hook is configured to be coupled to the second hook-receiver rod in a stored position when the second anchor hook is detached from the second stationary fixture.

18. The seat base of claim 17, wherein the housing includes a top opening in communication with the interior region, and further comprising a door having a first end and a second end, the first end of the door pivotably attached to the housing such that the door is pivotable between an open position and a closed position, the door providing access to the interior region through the top opening when the door is in the open position, the door substantially closing the top opening when the door is in the closed position, the door forming a belt passageway at the second end of the door when the door is in the closed position.

19. A seat base for a child restraint adapted to receive a juvenile seat, the seat base comprising a seat-base belt including a first anchor belt having a first free end with a first anchor hook adapted to mate with a first stationary fixture associated with a vehicle seat of a vehicle, and a second anchor belt having a second free end with a first anchor hook adapted to mate with a second stationary fixture associated with the vehicle seat, such that the seat-base belt anchors the seat base to the vehicle seat, the first anchor hook including a resiliently flexible first latch, the second anchor hook including a resiliently flexible second latch, a housing having a bottom wall, an interior region and a mounting member located in the interior region, the first anchor hook configured to be coupled to the mounting member when the first anchor hook is detached from the first stationary fixture such that the first latch of the first anchor hook is on the side of the first anchor hook that is located most distantly from the bottom wall of the housing, and the second anchor hook is configured to be coupled to the mounting member when the second anchor hook is detached from the second stationary fixture such that the second latch of the second anchor hook is on the side of the second anchor hook located most closely to the bottom wall of the housing.

20. The seat base of claim 19, wherein the mounting member comprises a first hook-receiver rod and a second hook-receiver rod, the first anchor hook configured to be coupled to the first hook-receiver rod such that the first latch is located above the first hook-receiver rod, and the second anchor hook configured to be coupled to the second hook-receiver rod such that the second latch is located below the second hook-receiver rod.

* * * * *